March 16, 1937.  H. F. KURTZ  2,074,088
APPARATUS FOR PRODUCING ORTHOSTEREOSCOPIC REPRESENTATIONS
Filed May 28, 1935  2 Sheets-Sheet 1
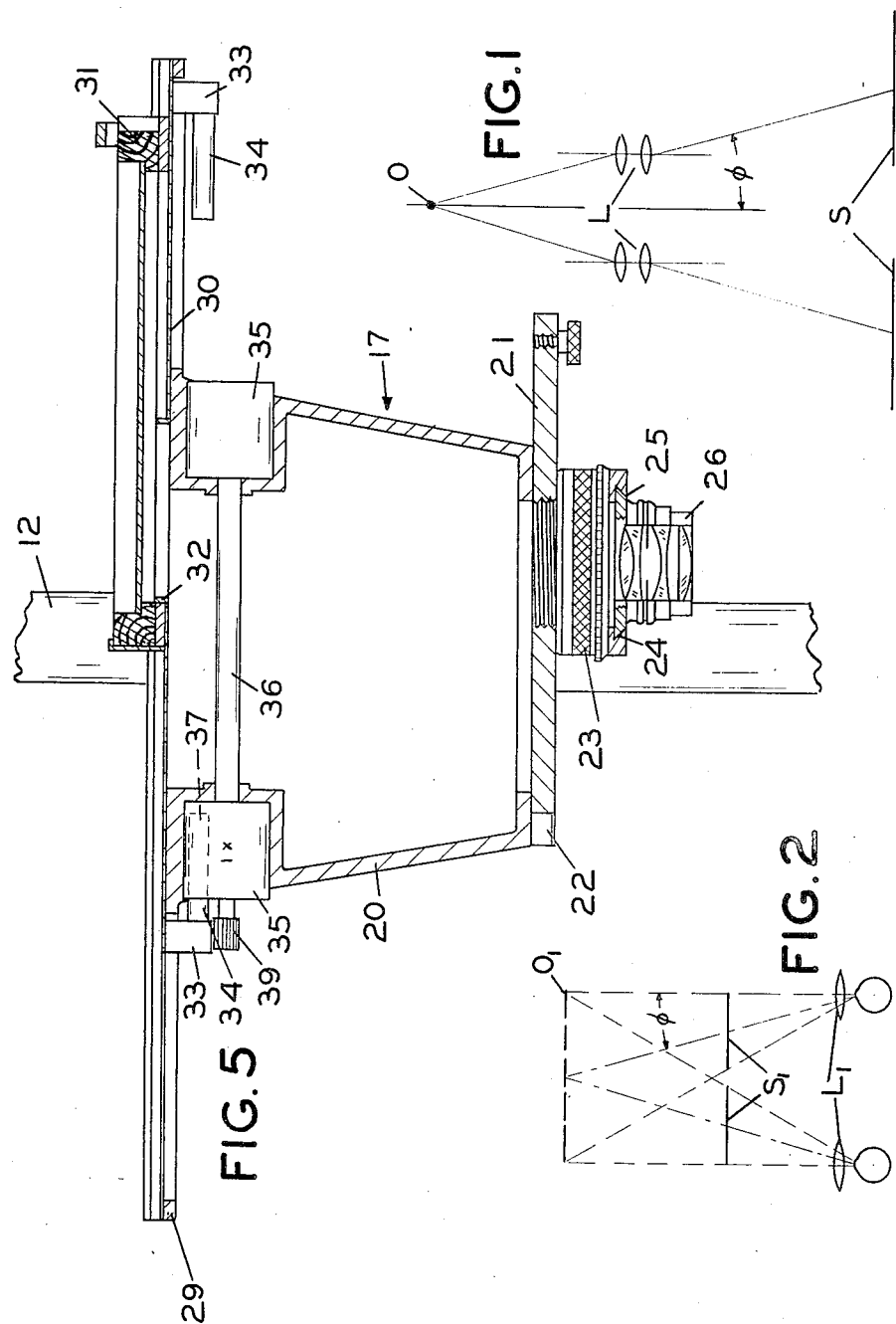
HENRY F. KURTZ
INVENTOR
BY *G. A. Ellestad*
ATTORNEY March 16, 1937. H. F. KURTZ 2,074,088
APPARATUS FOR PRODUCING ORTHOSTEREOSCOPIC REPRESENTATIONS
Filed May 28, 1935 2 Sheets-Sheet 2
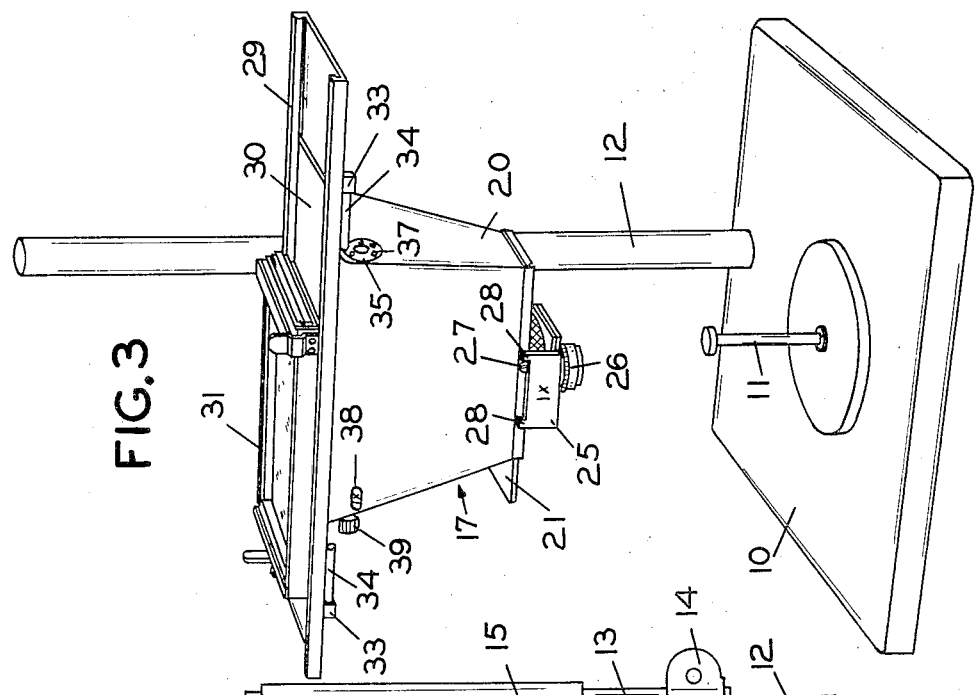
HENRY F. KURTZ.
INVENTOR
BY
ATTORNEY Patented Mar. 16, 1937

2,074,088

UNITED STATES PATENT OFFICE 2,074,088

APPARATUS FOR PRODUCING ORTHO-STEREOSCOPIC REPRESENTATIONS

Henry F. Kurtz, Rochester, N. Y., assignor to Bausch & Lomb Optical Company, Rochester, N. Y., a corporation of New York Application May 28, 1935, Serial No. 23,886

4 Claims. (Cl. 95—37)

The present invention relates to stereoscopy and more particularly to an apparatus for producing orthostereoscopic representations of objects.

One of the objects of this invention is to provide a new and improved means for obtaining orthostereoscopic representations. Another object is to provide an apparatus for producing orthostereoscopic representations at different magnifications. Another object is to provide an apparatus for producing orthostereoscopic representations, in which the distance from the lens to the image plane in the camera and the distance from the lens to the picture support in the viewing device are both fixed. A further object is to provide a new and improved camera. These and other objects and advantages reside in certain novel features of construction, arrangement and combination of parts as will hereinafter be more fully set forth and pointed out in the appended claims.

Referring to the drawings:

Fig. 1 is a diagrammatic view of the photographing system according to this invention.

Fig. 2 is a diagrammatic view of the viewing system.

Fig. 3 is a perspective view of the camera.

Fig. 4 is a side elevation thereof.

Fig. 5 is a vertical section thereof.

In the drawings Fig. 1 is a diagrammatic representation of a camera system for the production of orthostereoscopic photographs of objects at finite distances and at specified magnifications. In this figure, O designates an object which is imaged upon the spaced sensitive members S by the spaced lenses L.

In the following description $M_1$ represents the magnification due to the photography alone; $M_2$ the ultimate magnification desired in observation; and $M_3$ the magnification due the stereoscope alone. P represents the interpupillary distance and $d$ represents the shortest distance at which comfortable convergence and accommodation can be put into practice by an observer. The distance $d$ is a constant and will hereinafter be referred to as the normal viewing distance. It is necessary that the stereoscope have a constant magnification and hence $$\frac{M_1}{M_2}$$

is assumed equal to a constant $k$.

With this assumption, the conditions which must be met in the camera in order to secure orthostereoscopic results are as follows:

For the camera photographic system, the distance between photographic lens axes must equal $$\frac{P}{M_2} \quad (1)$$

The distance from the front principal plane of the lens to the object must equal $$\frac{d}{M_2} \quad (2)$$

The distance from the rear principal plane of the lens to the photographic plate must be equal to $$kd \quad (3)$$

The equivalent focal length of the photographic lens must be $$\frac{kd}{M_1+1} \quad (4)$$

The distance from the photographic plate to object must be $$kd\left(1+\frac{1}{M_1}\right) \quad (5)$$

to which must be added the separation between the principal planes of the photographic lenses.

The separation from center to center of the plates must be equal to $$kP\left(1+\frac{1}{M_1}\right) \quad (6)$$

Also a useful corollary equation is as follows:

$$M_1 = \frac{M_2 f_1}{d - M_2 f_1} \quad (7)$$

In the stereoscope the magnification $M_3$ and the normal viewing distance $d$ are both fixed. Thus the lenses $L_1$ and the photographs $S_1$ are rigidly mounted with respect to each other. The stereoscope must meet the following conditions:

The magnification of the stereoscope must be $$\frac{M_2}{M_1} = \frac{1}{k} \quad (8)$$

The equivalent focal length of the stereoscope lenses is determined by $$\frac{kd}{1-k} \quad (9)$$

The distance from eye to picture must equal $$kd \quad (10)$$

The separation between the pictures is $$kP(M_3-1) \quad (11)$$

The lens separation is P by definition.

The lenses $L_1$ in the stereoscope will form the image of the pictures $S_1$ in the plane $O_1$ which is the distance $d$ from the lenses whether $k$ is greater or less than unity. If $k$ is greater than unity, the plane $O_1$ is between the picture and the eye and if less than unity, the pictures are between the plane $O_1$ and the eye.

In choosing $M_1$ and $M_2$ for any particular case the selection will affect the size of the maximum useful field. If $M_1$ is chosen too large in comparison with $M_2$, the pictures will overlap in the stereoscope while if it is chosen too small in comparison with $M_2$ the pictures will be widely separated. The maximum useful field is obtained from the type of stereoscope shown in Fig. 2 when the plate separation in the camera is equal to the picture separation in the stereoscope or when $$kP\left(1+\frac{1}{M_1}\right)=kP\left(\frac{M_2}{M_1}-1\right)$$

or $$M_2=2M_1+1 \qquad (12)$$

In both the stereoscope and the camera the axes of the lenses are parallel and the angle $\phi$ is same in both systems. Other types of stereoscope such as the Wheatstone type may be used but the equations given above must be rigidly followed. The equations set forth above can be applied to other optical systems such as microscopes or telescopes to obtain orthostereoscopic images. In such systems the camera equations are applied to the objective and the stereoscope equations to the eyepiece.

The focal lengths of the lenses used and the object and image distances determine the magnification due to photography; the lateral positions (separation) of the lenses affect the perspective convergence lines in the photographs; the focal lengths of the stereoscope lenses and the distance of the pictures from them determine the magnification of the stereoscope, and the separation of the individual pictures determines the convergence of the lines of sight under which they are viewed. The focal length of the lenses in the stereoscope and the distance of the pictures must be so chosen that the lenses will image the pictures at the chosen normal viewing distance (the distance exemplified as at sixteen inches above). The separation of the individual pictures of the stereo pair must be such that they are imaged at this distance in superimposition upon each other. When and only when this is done is the all-important condition of harmony between accommodation and convergence attained that is present in normal and unaided vision. The fulfillment of this condition is absolutely necessary to the production of an orthoscopic view and complete comfort and normalcy in observation. The many closely related and inviolable conditions set forth above can be met by virtue of the solution of two series of interlocking equations, and can only be met by adherence to the distances and focal lengths dictated by their solution.

For convenience the stereoscope is usually made having a fixed magnification and a fixed distance from the eye to the picture. Thus the distance from the lens to the plate is fixed for the camera and the camera can be made with rigid walls. The ultimate magnification can then be varied by changing the camera magnification. It has also been found desirable to use a single lens and a single sensitive element in the camera and obtain the necessary lens separation and sensitive element separation by shifting the lens and element.

A suitable camera is illustrated in Figs. 3 to 5 wherein 10 indicates a base upon which is mounted an object support 11 and a vertical standard 12. A sleeve 13 is slidably mounted upon the standard 12 and can be fixed in a desired position by a suitable clamp 14. A second sleeve 15 is slidable on the sleeve 13 and carries an arm 16 upon which the camera 17 is mounted. A screw 18 is threaded into a fixed extension 19 on the sleeve 13 and supports the sleeve 15 so that rotation of the screw 18 moves the sleeve 15 to focus the camera 17.

The camera 17 comprises a rigid box 20 open at its upper and lower ends. A door 21 is slidable in a dove-tail groove 22 in the lower end of the box 20 and carries a shutter mechanism 23. The shutter mechanism 23 has a dove-tail groove 24 perpendicular to the groove 22 and a plate 25 is slidable into this groove 24 carrying a lens 26 is slidable to the camera box 20. Adjacent the groove 22 the camera box 20 is provided with a lug 27. The outer end of the plate 25 is bent upwardly and is provided with two spaced lugs 28. As can be seen in Fig. 3 the lugs 27 and 28 form cooperating stops to limit the sliding movement of the door 21 carrying the lens 26. Each different focal length lens has its own plate 25 and the lugs 28 are so spaced that the lateral sliding movement of the lens will conform to the spacing of the lens axes specified in Equation (1) above.

A long horizontal guideway 29 is mounted at the open upper end of the box 20 and an aperture plate 30 is slidably mounted in the guideway 29. Also slidable in the guideway 29 is a suitable film or plate holder 31. The aperture plate 30 has an upstanding flange 32 surrounding the aperture and this flange extends upwardly into the path of the plate or film holder 31. From Fig. 5 it is obvious that when the holder 31 is moved to the left, the aperture plate 30 will not move until the right hand rim of the holder 31 contacts with the flange 32. In this way the stereoscopic pictures are automatically transposed on the sensitive element.

In order to regulate the spacing between the pictures, each end of the aperture plate 31 has a depending portion 33 upon which is mounted an inwardly extending plunger 34. Two drums 35 rigidly connected by a shaft 36 are rotatably mounted in the camera box 20 in alignment with the plungers 34. Each drum 35 has a series of holes 37 each of different depth and the drums 35 are so connected to the shaft 36 that the equivalent hole 37 on each drum will be presented and form a stop for its plunger 34. The camera box has a window 38 in the front wall in alignment with indicia marked on one drum 35. The drum is preferably marked in terms of magnification so that by rotating the drum until the desired magnification number appears through the window 38, the proper amount of picture separation is automatically determined since the amount of shift of picture areas is controlled by the depth of the hole 37 into which the plunger 34 moves.

In taking the pictures with this camera, the object is focused by moving the entire camera relative to the object. A lens 26, of a focal length to give the desired magnification, is then moved to one of its extreme positions as limited by the cooperating stops 27 and 28. The knurled head 39, connected to the drums 35 is then rotated until the desired magnification number appears in the window 38. The plate or film holder 31 is moved in the same direction as the lens to its extreme position as limited by the cooperating stops comprising the drums 35 and plungers 34. After an exposure is made both lens and holder are moved in the same direction to their other extreme positions for the second exposure. The picture thus produced needs no modification for use in the sterescope since the parts of the stereoscope are all fixed relative to each other.

From the foregoing it will be apparent that I am able to attain the objects of my invention and provide a new and improved apparatus for producing orthostereoscopic representations at different magnifications. Various modifications can, of course, be made without departing from the spirit of my invention or the scope of the appended claims.

I claim:

1. A camera for stereoscopic photography comprising a camera body, a lens mount slidably carried on one end of said body, cooperating stops on said body and said mount for limiting the sliding movement of said lens mount, an element holder slidably carried on the other end of said body and cooperating stops on said body and said holder for limiting the sliding movement of said holder.

2. A camera for stereoscopic photography comprising a camera body, a lens movably mounted at one end of said body, means for moving said lens a predetermined amount, a sensitive element holder movably mounted at the other end of said body and means for moving said holder the distance of the lens movement multiplied by the photographic magnification plus one, in the same direction as the lens.

3. A photographic apparatus for producing pictures which are truly orthostereoscopic when viewed in a stereoscope having a fixed viewing distance and a fixed magnification, said apparatus comprising a camera body, means on said body for slidably securing a lens mount to one end of said body, cooperating stops on said body and said mount for limiting the sliding movement of said mount, a sensitive element holder slidably mounted on the other end of said body at a fixed distance from said lens, and cooperating stop means on said body and on said holder for limiting the sliding movement of said holder.

4. In a photographic camera, a light proof body having an open end, a guide adjacent said open end, an aperture plate slidable in said guide, cooperating stops on said aperture plate and on said body for limiting the sliding movement of said plate, a sensitive element holder slidable in said guide and cooperating stops on said element holder and on said aperture plate for limiting the relative sliding movement between said holder and said plate.

HENRY F. KURTZ.